(12) United States Patent
Baumann

(10) Patent No.: US 8,356,685 B2
(45) Date of Patent: Jan. 22, 2013

(54) ARRANGEMENT FOR STRENGTHENING THE ROAD GRIP FOR A VEHICLE

(75) Inventor: Karl-Heinz Baumann, Bondorf (DE)

(73) Assignee: Daimler AG, Stuttgart (DE)

( * ) Notice: Subject to any disclaimer, the term of this patent is extended or adjusted under 35 U.S.C. 154(b) by 218 days.

(21) Appl. No.: 12/841,758

(22) Filed: Jul. 22, 2010

(65) Prior Publication Data

US 2011/0017538 A1 Jan. 27, 2011

(30) Foreign Application Priority Data

Jul. 24, 2009 (DE) .......................... 10 2009 034 582

(51) Int. Cl.
*B60B 39/00* (2006.01)

(52) U.S. Cl. ........ 180/164; 180/116; 180/118; 180/119; 180/120

(58) Field of Classification Search .................. 180/164, 180/116, 118, 119, 115
See application file for complete search history.

(56) References Cited

U.S. PATENT DOCUMENTS

| 3,628,625 | A | * | 12/1971 | Boyles, Jr. | 180/164 |
| 3,894,609 | A | | 7/1975 | Wulf | |
| 4,018,541 | A | * | 4/1977 | Denikin et al. | 404/130 |
| 4,896,749 | A | * | 1/1990 | Walker | 188/5 |
| 6,158,556 | A | * | 12/2000 | Swierczewski | 188/5 |
| 6,336,515 | B1 | * | 1/2002 | Secondari | 180/164 |
| 6,401,876 | B1 | * | 6/2002 | Boros | 188/5 |
| 6,742,617 | B2 | * | 6/2004 | Jeswine et al. | 180/164 |

FOREIGN PATENT DOCUMENTS

| DE | 2 251 152 | 5/1974 |
| DE | 34 03 636 A1 | 8/1985 |
| DE | 10 2005 009 949 A1 | 9/2006 |

* cited by examiner

*Primary Examiner* — Lesley D Morris
*Assistant Examiner* — Marlon Arce
(74) *Attorney, Agent, or Firm* — Crowell & Moring LLP

(57) ABSTRACT

In an arrangement for strengthening the road grip for a vehicle, particularly for a passenger car, air can be sucked from a vacuum chamber arranged under the vehicle and closed off with respect to the ambient atmosphere. As a result, a vacuum can be generated in a vacuum chamber arranged in a braking plate, and the latter can be changed from an inoperative position away from the ground into a operative position close to the ground, as a result of the generated vacuum.

8 Claims, 2 Drawing Sheets

ARRANGEMENT FOR STRENGTHENING THE ROAD GRIP FOR A VEHICLE

BACKGROUND AND SUMMARY OF THE INVENTION

This application claims the priority of German patent document 10 2009 034 582.5, filed Jul. 24, 2009, the disclosure of which is expressly incorporated by reference herein.

The invention relates to an arrangement for strengthening the road grip for a vehicle.

German Patent Document DE 10 2005 009 949 A1 describes an arrangement and a process for reducing the consequences of a collision of a vehicle with an obstacle, having a range determination device which determines the distance dimension describing the distance of the vehicle from the obstacle and transmits it to a control unit. The control unit determines the remaining time period to the collision between the vehicle and the obstacle and, as a function thereof, first triggers one or more driver warning systems and an automatic braking operation when a collision is unavoidable. In the area of the vehicle underside, at least one braking component having frictional braking devices is provided which are placed in contact with the road surface in a braking position of the braking component during the automatic braking operation.

German Patent Document DE 34 03 636 A1 describes an arrangement for strengthening the road grip for a motor vehicle, particularly for a passenger car, in which case, air is sucked by means of a jet pump from a vacuum chamber formed between the vehicle and the road, closed at the edge and sealed off with respect to the atmosphere, so that, on the blowing gas side, the jet pump is connected with the exhaust pipe of the vehicle engine and, on the suction side, the jet pump is connected with the vacuum chamber.

German Patent Document DE 2 251 152 describes an arrangement for increasing a road grip in a vehicle, particularly a passenger car, below which a vacuum can be generated for sucking off air at least in a partial area, which can be defined by a shielding provided between the vehicle and the road, which shielding can be changed from an inoperative position away from the ground into an operative position close to the ground. This shielding is formed by a ring cushion, which surrounds the partial area to which a vacuum is applied, which ring cushion is connected with the vehicle superstructure.

It is an object of the present invention to provide an improved arrangement for strengthening the road grip for a vehicle.

This and other objects and advantages are achieved by the arrangement according to the invention for strengthening the road grip for a vehicle, particularly for a passenger car, in which air can be sucked from a vacuum chamber arranged under the vehicle and closed off with respect to the ambient atmosphere, so that a vacuum can be generated. The vacuum chamber is arranged according to the invention in a braking plate which can be changed from an inoperative position away from the ground into an operative position close to the ground as a result of the generated vacuum. The generated vacuum presses the braking plate onto the road, and will generate an additional braking force which advantageously shortens a braking distance of the vehicle and/or reduces an impact speed of the vehicle upon an obstacle. Thus, for example, before a collision of the vehicle with an obstacle, a clearly higher kinetic energy can be reduced than could be reduced by means of conventional vehicle braking systems.

As a result, the consequences of an accident will be decreased in a particularly advantageous manner.

Other objects, advantages and novel features of the present invention will become apparent from the following detailed description of the invention when considered in conjunction with the accompanying drawings.

DETAILED DESCRIPTION OF THE INVENTION

Mutually corresponding parts are provided with the same reference numbers in all figures.

Figure 1:
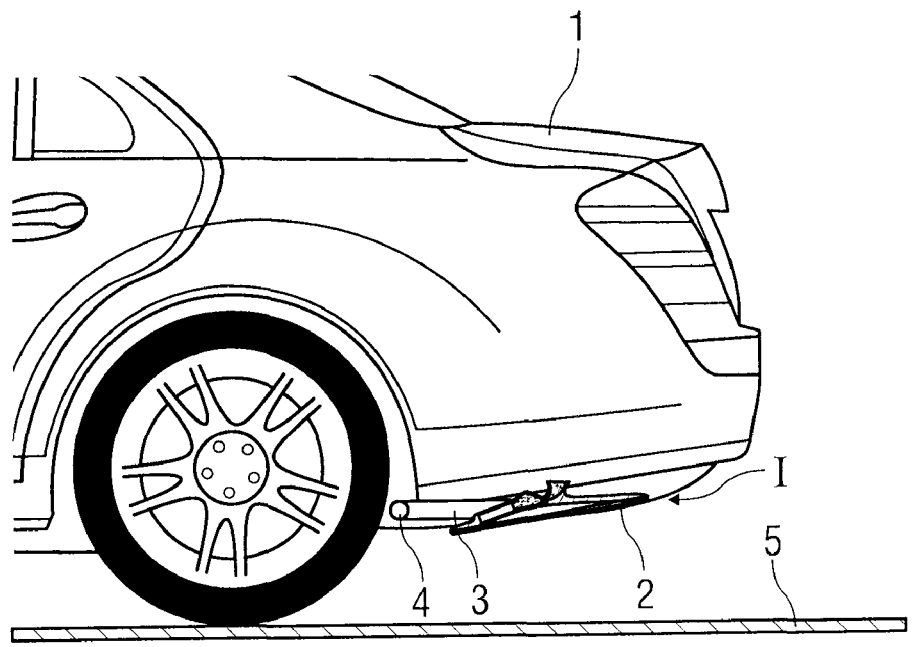
FIG. 1 is a schematic view of a vehicle having a braking plate according to the invention arranged under, it in an inoperative position away from the ground.

FIG. 1 is a schematic view of a vehicle 1 having a braking plate 2 arranged under it, shown in an inoperative position I away from the ground.

Figure 2:
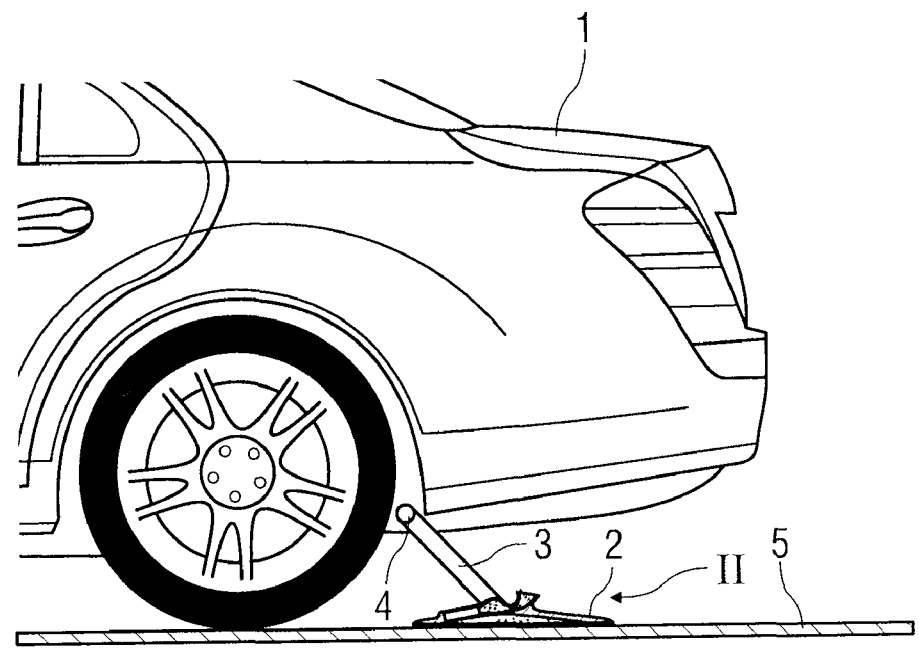
FIG. 2 is a schematic view of a vehicle having the braking plate of FIG. 1 arranged under it, in an operative position close to the ground.

FIG. 2 is a schematic view of the vehicle 1 having the braking plate 2 arranged under it, shown in an operative position II close to the ground.

FIG. 2 shows a braking plate 2 in a lowered in therefore in the active braking position. During the normal operation of the vehicle 1, as illustrated in FIG. 1, the braking plate 2 is hidden under the vehicle 1 in a retracted manner in order not to limit a ground clearance of the vehicle 1.

For example, in the inoperative position I, which causes no braking effect between the vehicle and the road surface 5 and therefore does not decelerate the vehicle 1, the braking plate 2 is arranged in an installation recess which is provided on the underside of the vehicle and is not shown in detail.

A lever 3 is arranged between the vehicle 1 and the braking plate 2. In a manner not shown in detail, this lever 3 is disposed in a rotatable or articulated manner on the vehicle 1, particularly on a vehicle underside as well as on the braking plate 2. As a result, a tension-proof connection becomes possible between the vehicle 1 and the braking plate 2, by means of which connection an additional braking forces can be introduced into the vehicle 1.

In one embodiment of the invention, the lever 3 is formed, for example, from a metallic material. In a further embodiment, the lever 3 is constructed, for example, as a hollow profile.

The braking plate 2 can be arranged in any position underneath the vehicle 1. Viewed in the longitudinal direction of the vehicle 1, the braking plate 2 is advantageously connected with the vehicle 1 in the area of its center of gravity, and especially is linked to the vehicle 1. The closer the connection point 4 between the lever 3 and the vehicle 1, viewed in the longitudinal direction of the vehicle 1, is situated to the level of the center of gravity of the vehicle 1, the greater the braking forces which can be achieved during the braking operation by means of the braking plate 2 for decelerating the vehicle 1.

In the inoperative position I away from the ground, the braking plate 2 can be situated in the area of the vehicle underside and can be acted upon by a pretensioning force of a pretensioning element (not shown in detail), which pretensioning force urges the braking plate 2 in the direction of the braking position close to the ground. In this manner, during the operation of the vehicle 1, the braking plate 2 will be disposed on the vehicle underside when no braking operation is carried out, so that a sufficient ground clearance is made achieved. For this purpose, corresponding recesses for receiving the braking plate 2 can be provided on the vehicle underside.

The braking plate 2 is held in the inoperative position I against the pretensioning force by triggering devices (not shown) in the inoperative position I. When the triggering devices are, for example, controlled electrically, the pretensioning force of the pretensioning element can be utilized for the displacement motion of the braking plate 2 from its inoperative position I into the braking position II.

Control of the triggering devices may, for example, take place by means of the process for reducing the consequences of a collision of a vehicle and an obstacle described in German Patent Document DE 10 2005 009 949 A1, which is hereby incorporated herein.

In another embodiment, the braking plate 2 can be activated independently of the conventional braking system of the vehicle 1 which comprises, for example, a service brake device and a parking brake device of the vehicle 1. In an alternative embodiment, the braking plate 2 can be activated together with the conventional braking system of the vehicle 1.

Figure 3:
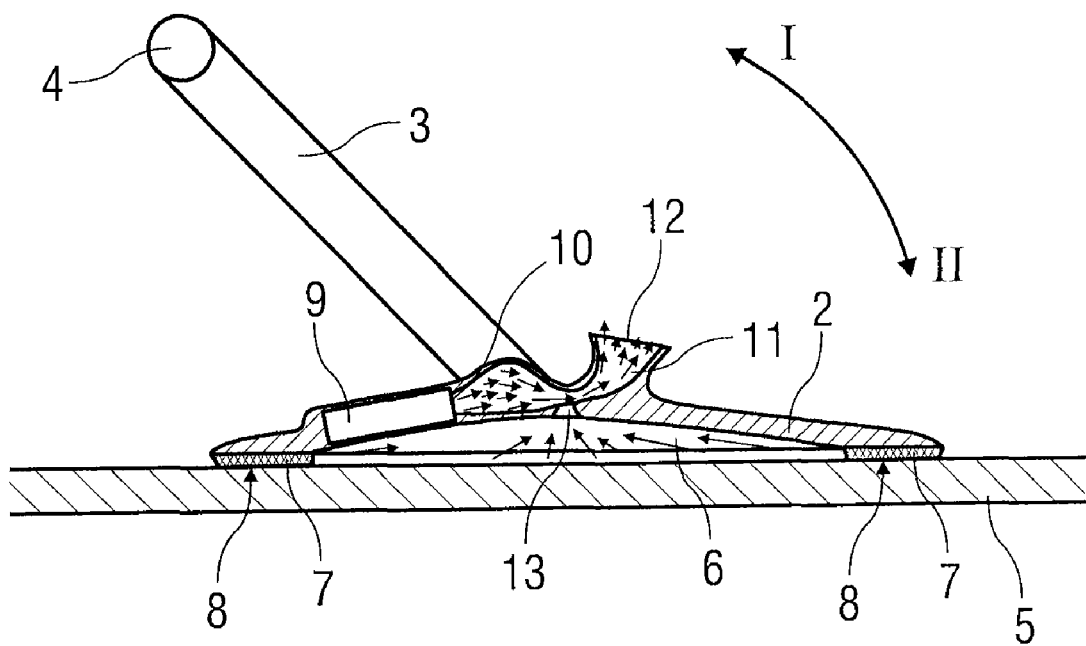
FIG. 3 is a schematic sectional view of the braking plate according to the invention, in an operative position close to the ground.

FIG. 3 is a schematic view of the braking plate 2 in the operative position II close to the ground.

In an embodiment of the invention, the braking plate 2 has a plate-shaped and upwardly curved (that is, opposite the road surface 5 and toward the vehicle floor) construction. As a result, an indentation or recess is formed in the direction of the road surface 5 in the braking plate 2, which indentation or recess forms a vacuum chamber 6 arranged centrally in the braking plate 2.

In this case, the braking plate 2 is designed such that a volume forms between the vehicle floor and the road surface 5, which volume can be evacuated, and this condition can be maintained for an especially short time, for example, for maximally two seconds. In other words, the vacuum chamber 6 in the braking plate 2 formed by the curvature is shaped such that by the suction of air from the vacuum chamber 6, a vacuum can be achieved over a time period of up to two seconds.

Thus, for example, in the case of an evacuation of the volume of a vacuum chamber 6 which is integrated in a braking plate 2 having surface dimensions of 200 mm*400 mm, a suction force of maximally 12,000 N and, (in the case of a friction factor 1 of the braking plate 2) a braking force of 12,000 N can be generated. By means of a corresponding control and activation of the suction of air from the vacuum chamber 6 when a collision risk is identified (for example, 0.5 s before an impact, and at a driving speed of 50 km/h) an additional degradation of energy of 84,000 Nm can be achieved by means of the vacuum chamber 6 arranged in the braking plate 2 and by moving and pressing the braking plate 2 in the direction of or against the road surface 5.

Additionally, the braking plate 2 may have a flexible construction in such a manner that it can compensate possible unevennesses of the road surface 5.

The braking plate 2 may also have a flexible contact surface 8 toward the surface 5 of the road. In a further embodiment, a friction and/or sealing surface 7 may be arranged on this contact surface 8. As an alternative, the contact surface 8 itself may form the friction and/or the sealing surface 7. The friction and/or sealing surface 7 is preferably formed of a viscous molding material and may, for example, be lip-shaped. This can also compensate unevennesses of the road. In addition, the vacuum chamber 6 is sealed off with respect to the environment by means of the sealing lips of the friction and/or sealing surface 7.

Furthermore, the braking plate 2 may have a circular construction on a contact surface 8 with respect to the road surface 5.

In an edge area of the circular contact surface 8, the friction and sealing surface 7 has a ring-shaped construction. This friction and sealing surface 7 is formed, for example, of a viscous material, particularly a rubber mixture, and is constructed in the shape of a sealing lip.

In the braking position II of the braking plate 2, the friction and sealing surface 7 is in contact with the road surface 5, and the vacuum chamber 6 is sealed off by the friction and sealing surface 7 with respect to the ambient atmosphere and is acted upon by a vacuum. As a result of this vacuum, a braking force is generated between the road surface 5 and the braking plate 2. In addition, by means of the toothing effects of the material of the friction and/or sealing surface 7 with the road surface 5, friction is increased between the friction and/or sealing surface 7 and the road surface 5. This increases the braking force generated by the braking plate 2.

The braking plate 2 and/or the friction and sealing surface 7 are constructed such that, during a horizontal movement of the braking plate 2 over the road surface 5, the vacuum is maintained, because at least as much air volume is sucked out of the vacuum chamber 6 as the amount of the flow that follows as a result of the displacement of the braking plate 2 on the road surface 5.

A gas generator 9 is arranged in an upper area of the braking plate 2. The gas generator is a technical system for the carburetion of fuels. When the gas generator 9 is activated, it will generate a large volume flow of a gas mixture. The activation of the gas generator 9 takes place, for example, simultaneously or in a time-staggered manner with the controlling of the triggering devices of the braking plate 2.

A gas outflow opening 10 of the gas generator 9 leads into a gas discharge port 11, which ends in a gas discharge opening 12, through which the gases generated in the gas generator 9 flow out into the atmosphere. The gas discharge opening 12 is arranged, for example, to be pointing vertically or almost vertically upward, thus into direction pointing away from the road surface 5. As a result, a repulsion energy contained in the volume flow of the gas mixture is utilized such that the repulsion energy exerts an additional force upon the braking plate 2, which increases the braking force between the road surface 5 and the braking plate 2.

The gas generator 9, the gas outflow opening 10 and the gas discharge port 11 are arranged within the braking plate 2. Behind the gas outflow opening 10, the cross-section of the gas discharge port 11 at first increases to a multiple of the cross-section of the gas outflow opening 10. A connecting conduit 13 is arranged between the gas discharge port 11 and the vacuum chamber 6. At the point of the gas discharge port 11 at which the connecting conduit 13 leads into the gas discharge port 11, the cross-section of the gas discharge port 11 is reduced such that an arrangement according to the principle of a Venturi tube is created between the gas discharge port 11 and the connecting conduit 13.

The Venturi tube consists of a tube section having a reduced cross-section, a mouth of a removal tube being arranged at the point of the smallest cross-section. When a gaseous or liquid medium flows through the Venturi tube, the dynamic pressure—also called ram pressure—will be maximal at the narrowest point of the tube section and the static pressure will be minimal. The rate of the flowing gas or of the liquid will rise proportionally to the cross-sections when flowing through the constricted part because the same amount of gas or liquid will flow through everywhere. The pressure in the removal tube, which is arranged exactly in the contracted cross-section, will fall simultaneously. As a result, a differential pressure is obtained which is then used, for example, in various measuring equipment or for taking in liquids or gases.

The cross-section of the gas discharge port 11 at the connection between the gas discharge port 11 and the connecting conduit 13 is reduced, for example, in comparison to the cross-section of the gas outflow opening 10. Behind the mouth of the connecting conduit 13 into the gas discharge port 11, the cross-section of the gas discharge port 11 widens to a multiple of the reduced cross-section at the mouth of the connecting conduit 13 into the gas discharge port 11 and ends in the gas discharge opening 12 through which the volume flow of the gas mixture flows into the atmosphere.

When the gas mixture generated in the gas generator 9 flows through the gas outflow opening 10 into the gas discharge port 11 and, in the further course of the gas discharge port 11, to the mouth of the connecting conduit 13 into the gas discharge port 11, a high ram pressure is generated at the narrowest cross-section of the gas discharge port 11. As a result of this ram pressure, a vacuum is generated in the connecting conduit 13, by means of which vacuum, the ambient air contained in the vacuum chamber 6 is evacuated from the vacuum chamber 6. The vacuum is thereby generated that is required for the function of the braking plate 2.

In a manner not shown in detail, the vacuum and/or the generating of gas in the gas generator 9 can be interrupted at any point in time controlled by the driver or by a control unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for strengthening road grip of a vehicle, said apparatus comprising:
    a braking plate which can be changed from an inoperative position away from the ground into an operative position close to the ground;
    a vacuum chamber that is arranged in the braking plate, under the vehicle, and is closed off with respect to the ambient atmosphere when said braking plate is in said operative position; and
    a device for sucking air from the vacuum chamber, so that a vacuum is generated therein, whereby the braking plate moves into said operative position close to the ground, wherein said device for sucking air comprises a gas generator that acts upon a Venturi tube.

2. The apparatus according to claim 1, wherein said vacuum is such that the braking plate can be pressed against the road surface.

3. The apparatus according to claim 1, wherein the braking plate is swivelably held on the vehicle underside, by means of a lever.

4. The apparatus according to claim 1, wherein a contact surface of the braking plate with respect to the road surface has a friction and sealing surface in an edge area thereof.

5. The apparatus according to claim 4, wherein the contact surface has a circular construction.

6. The apparatus according to claim 5, wherein the circular contact surface has a ring-shaped friction and sealing surface in said edge area.

7. The apparatus according to claim 4, wherein at least one of the braking plate and the friction and sealing surface has a flexible construction.

8. The apparatus according to claim 1, wherein said device for sucking air includes a gas generator having a gas discharge opening oriented away from the road surface.

* * * * *